(12) United States Patent
Emanet et al.

(10) Patent No.: US 11,929,607 B2
(45) Date of Patent: Mar. 12, 2024

(54) MAINS POWER-OPERATED DISTRIBUTED DISCONNECT FOR SOLAR POWER SYSTEM RAPID SHUTDOWN

(71) Applicant: Monitek L.L.C., East Greenwich, RI (US)

(72) Inventors: Nahit Emanet, Istanbul (TR); Oezguer Aksoy, Miami, FL (US); Mustafa Mihmanli, Istanbul (TR)

(73) Assignee: MONITEK, LLC, Miami, FL (US)

( * ) Notice: Subject to any disclaimer, the term of this patent is extended or adjusted under 35 U.S.C. 154(b) by 0 days.

(21) Appl. No.: 17/569,970

(22) Filed: Jan. 6, 2022

(65) Prior Publication Data

US 2023/0216290 A1   Jul. 6, 2023

(51) Int. Cl.
*H02H 7/20*      (2006.01)
*H02J 3/38*      (2006.01)

(52) U.S. Cl.
CPC .............. *H02H 7/20* (2013.01); *H02J 3/381* (2013.01); *H02J 2300/24* (2020.01)

(58) Field of Classification Search
CPC ......... H02H 7/20; H02J 3/381; H02J 2300/24
See application file for complete search history.

(56) References Cited

U.S. PATENT DOCUMENTS

| | | | |
|---|---|---|---|
| 9,525,286 B2 | 12/2016 | Kohler | |
| 10,305,273 B2 | 5/2019 | Zhu et al. | |
| 10,998,761 B2 | 5/2021 | Judkins et al. | |
| 11,177,770 B2 | 11/2021 | Xu et al. | |
| 2012/0081934 A1* | 4/2012 | Garrity | H02J 3/381 363/37 |

(Continued)

FOREIGN PATENT DOCUMENTS

| | | |
|---|---|---|
| IN | 3446CHE2013 A | 2/2015 |
| WO | WO-2021000253 A1 | 1/2021 |

(Continued)

OTHER PUBLICATIONS

Tigo, "Tigo TS4-A-2F", downloaded from https://www.tigoenergy.com/products/ts4-a-2f on Jan. 13, 2022, 7 pages (pp. 1-7 in pdf).

(Continued)

*Primary Examiner* — Daniel Cavallari
*Assistant Examiner* — Brian K Baxter
(74) *Attorney, Agent, or Firm* — Mitch Harris, Atty at Law, LLC; Andrew M. Harris (57) ABSTRACT

A solar power generation system provides safety for personnel working on or around the system. The solar power generation system includes multiple solar panels, multiple cut-off devices separate from the plurality of solar panels and a master control unit. The cut-off devices are coupled in series with corresponding sub-groups of the plurality of solar panels and connect and disconnect outputs of the corresponding sub-groups from a solar power output chain or bus. The master control unit has at least one power supply output coupled to the plurality of cut-off devices, and a power supply input that receives a power source independent of an output of the plurality of solar panels. The cut-off devices are deactivated to open-circuit a connection of the corresponding sub-group when the power source is removed from the power supply input.

24 Claims, 8 Drawing Sheets

(56) References Cited

U.S. PATENT DOCUMENTS

| | | | | |
|---|---|---|---|---|
| 2012/0242303 A1* | 9/2012 | Ishii | .......................... | H02J 1/10 |
| | | | | 323/234 |
| 2015/0236638 A1* | 8/2015 | Moslehi | ................... | H02S 40/34 |
| | | | | 136/251 |
| 2015/0244315 A1* | 8/2015 | McNamara | ............... | H02J 7/35 |
| | | | | 136/244 |
| 2015/0270709 A1* | 9/2015 | Abu Qahouq | .......... | H02J 1/108 |
| | | | | 307/29 |
| 2015/0349583 A1* | 12/2015 | Yamada | ................ | H02M 3/158 |
| | | | | 307/46 |
| 2016/0211797 A1* | 7/2016 | Zhu | .......................... | H02S 40/34 |
| 2016/0226252 A1* | 8/2016 | Kravtiz | .................. | G01R 29/26 |
| 2018/0294645 A9* | 10/2018 | Hudson | ................... | H02S 40/36 |
| 2018/0309301 A1* | 10/2018 | Wang | ..................... | H02S 40/32 |
| 2018/0351366 A1* | 12/2018 | Handelsman | ........... | H02J 1/102 |
| 2019/0074684 A1 | 3/2019 | Craciun et al. | | |
| 2019/0140589 A1* | 5/2019 | Yen | .......................... | H02S 50/00 |
| 2021/0091556 A1* | 3/2021 | Pursifull | .............. | H02H 1/0007 |
| 2021/0313807 A1 | 10/2021 | Mahkota et al. | | |
| 2021/0408964 A1* | 12/2021 | Wang | ...................... | H02J 9/061 |
| 2022/0109399 A1* | 4/2022 | Ogura | ..................... | H02H 1/00 |
| 2022/0137657 A1* | 5/2022 | Ogura | ....................... | G05F 1/67 |
| | | | | 307/149 |
| 2022/0255500 A1* | 8/2022 | Ogura | ..................... | H02S 40/30 |

FOREIGN PATENT DOCUMENTS

| | | |
|---|---|---|
| WO | WO-2021024339 A1 | 2/2021 |
| WO | WO-2021038916 A1 | 3/2021 |
| WO | WO-2020174657 A1 | 12/2021 |

OTHER PUBLICATIONS

Tigo, Tigo TS4 Brochure, downloaded from https://assets-global.website-files.com/5fad551d7419c7a0e9e4aba4/61b2a5eba1a8735c590e8b44_TS4-A-F(700W) (Fire Safety Add-on) Datasheet EN_12092021.pdf on Jan. 13, 2022, 3 pages (pp. 1-3 in pdf).

IMO, Product Catalog, downloaded from https://www.imoautomation.com/products/73000000_on_1/13/2022, 5 pages (pp. 1-5 in pdf).

AP Smart, AP Smart product literature, downloaded from https://apsmartglobal.com/ on Jan. 13, 2022, 9 pages (pp. 1-9 in pdf).

Northern Electric "Rapid Shutdown Solutions (RSD) PVG-Guard", downloaded from https://northernep.com/products/rapid-shutdown-solutions/ on Jan. 13, 2022, 7 pages (pp. 1-7 in pdf).

* cited by examiner

MAINS POWER-OPERATED DISTRIBUTED DISCONNECT FOR SOLAR POWER SYSTEM RAPID SHUTDOWN

BACKGROUND

1. Field of Disclosure

The field of representative embodiments of this disclosure relates generally to solar power generation systems, and in particular, to a mains power-operated distributed disconnect for rapid shutdown in a solar power generation system.

2. Description of the Related Art

Solar power generation systems are in widespread use both in systems designed to supplement the commercial power grid and in systems designed for stand-alone operation. Photo-voltaic (PV) power systems are implemented to combine large numbers of solar panels or photo-voltaic arrays (PVAs) having a relatively low output voltage, e.g., 12V, 24V, or 48V and a relatively high output current. In order to improve efficiency and to reduce the size of output power distribution conductors, groups of solar panels, which have a lower output voltage, are connected in series to produce a higher total output voltage for the group, which is then used to provide a high voltage direct-current (DC) input that may be converted via an inverter to a high voltage alternating-current (AC) power output compatible with a commercial AC power grid.

However, the series combination of solar panels leads to dangerously high DC voltages across nodes and on interconnect conductors in the PV system. Safety requirements mandate that a shut-off system be employed that disconnects the series-connected panels to reduce the highest voltage present in the system to below a safety limit, e.g., 165 VDC. Typical mechanisms for providing such a safety feature are disconnect modules that use signaling, either wireless, or wired to receive a command to "break" sub-groups of the panels, so that the sub-group output voltages do not combine, via their series-connection, to produce hazardous voltages in the system. The disconnect devices employed to disconnect PVAs in the sub-groups are typically powered by one or more of the PVAs, and are typically controlled by wireless control signaling, or wired control signaling, such as power-line communication (PLC) techniques. Therefore, failure of a disconnect to either receive a cut-off signal, or perform the disconnect upon receiving the signal, is not only dependent on reliable signal reception, either via PLC or wirelessly, but also on the power supply produced by the PVAs, which may fluctuate due to variations in solar irradiation incidence.

Therefore, it would be desirable to provide a solar power generation system that provides safety for emergency personnel that is not dependent on PVA output or complex signaling.

SUMMARY

The above objectives, among others, are achieved in solar power generation systems, and their methods of operation.

The solar power generation system includes multiple solar panels, multiple cut-off devices separate from the solar panels and coupled in series with corresponding sub-groups of the solar panels, and a master control unit. The cut-off devices connect and disconnect outputs of the corresponding sub-groups from a solar power output chain or bus. The master control unit has at least one power supply output that is coupled to the plurality of cut-off devices and a power supply input receiving a power source independent of an output of the solar panels. The cut-off devices are de-activated to open-circuit a connection of the corresponding sub-group when the power source is removed from the power supply input.

The summary above is provided for brief explanation and does not restrict the scope of the Claims. The description below sets forth example embodiments according to this disclosure. Further embodiments and implementations will be apparent to those having ordinary skill in the art. Persons having ordinary skill in the art will recognize that various equivalent techniques may be applied in lieu of, or in conjunction with, the embodiments discussed below, and all such equivalents are encompassed by the present disclosure.

DESCRIPTION OF ILLUSTRATIVE EMBODIMENT

The present disclosure illustrates solar power generation systems with cut-off devices that provide safety for personnel working on or around the system. The solar power generation system includes multiple solar panels, multiple cut-off devices separate from the plurality of solar panels and a master control unit. The cut-off devices are coupled in series with corresponding sub-groups of the plurality of solar panels and connect and disconnect outputs of the corresponding sub-groups from a solar power output chain or bus. The master control unit has at least one power supply output coupled to the plurality of cut-off devices, and a power supply input that receives a power source independent of an output of the plurality of solar panels. The cut-off devices are deactivated to open-circuit a connection of the corresponding sub-group when the power source is removed from the power supply input.

Figure 1:
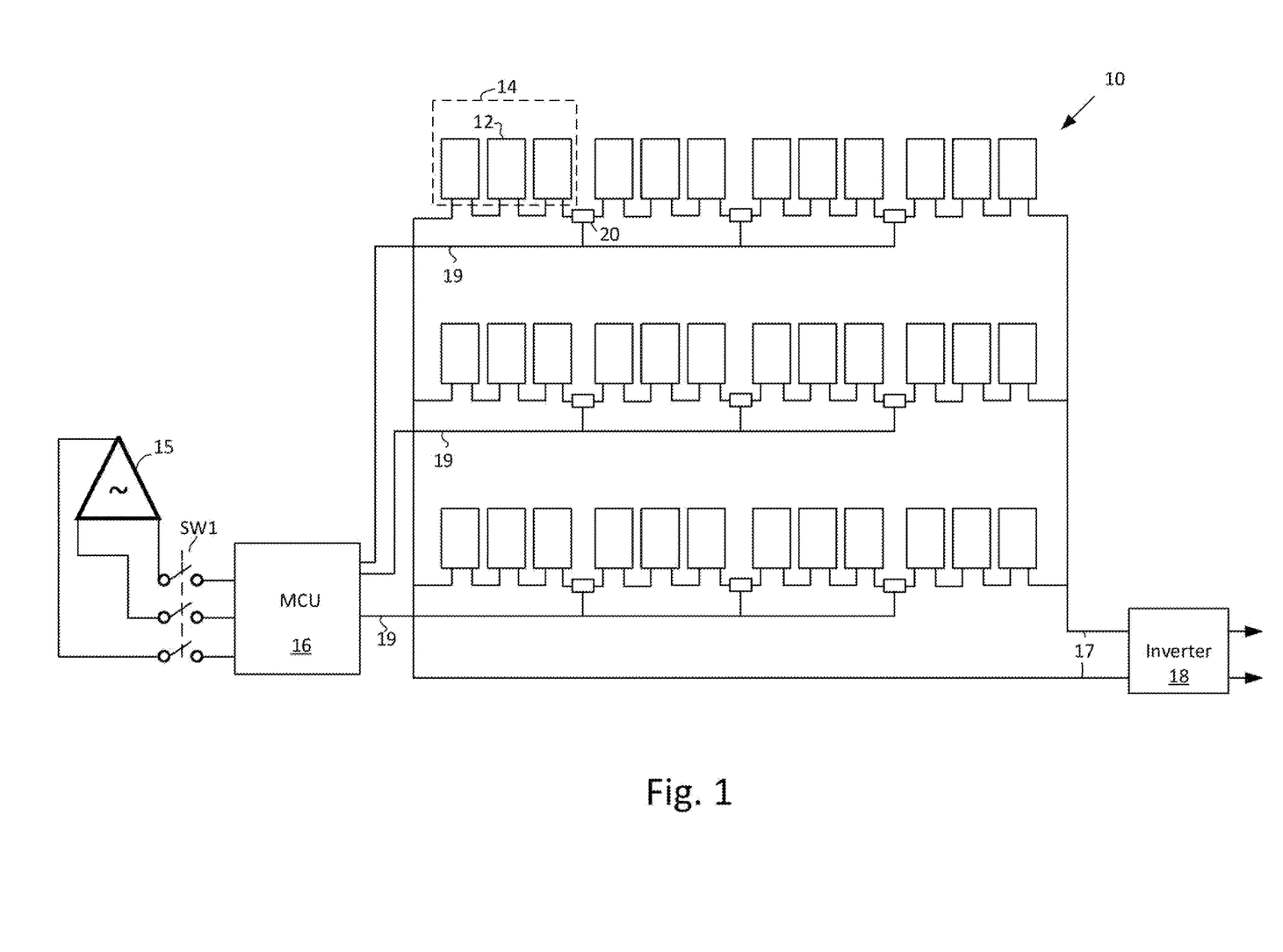
FIG. 1 is a block diagram showing an example solar power generation system 10, in accordance with an embodiment of the disclosure.

Referring now to FIG. 1, a block diagram of an example solar power generation system 10 is shown, in accordance with an embodiment of the disclosure. Multiple strings of photovoltaic arrays (PVAs) 12 are connected together in parallel to provide a DC input to an inverter 18 that provides an AC output. While operation of inverter 18 may be interrupted by a switch or other means to prevent generation of the AC output, the DC input provided from the combined PVAs 12 may still be present, as long as incident solar irradiation causes PVAs 12 to generate DC output. In order to prevent high DC voltage from being present in solar power generation system 10 while maintenance operations are performed, or when emergency personnel are working around solar power generation system 10, e.g., in the event of a fire or other disaster, multiple cut-off devices 20 are provided to isolate sub-groups 14 of PVAs 12, so that the greatest voltage present in solar power generation system 10 is only the voltage of the series-connected panels in the sub-groups 14. For example, in the illustrated solar power generation system 10, sub-groups 14 are formed from groups of three PVAs 12 and if the DC output of PVAs is 48V, the greatest voltage present across a sub-group is 144 VDC. Without cut-off devices 20, the output voltage of the depicted group of PVAs would be 576 VDC, which may be considered to be in excess of safety standards, e.g., 165 VDC as a maximum within a system. In practice, for efficiency, the number of sub-groups may be higher, which provides for more efficient inversion to a commercial AC output, and reduces the required wire gauge in the series connections between PVAs and the wiring between PVAs 12 and inverter 18, over that that would be required for a lesser number of series-connected PVAs 12. Strings of sub-groups form a series-connected chain and the chains are combined via a parallel power bus 17 that provides the input voltage to inverter 18 at the desired high DC voltage level.

In order to provide reliable rapid shutdown of illustrated solar power generation system 10, solar power generation system 10 includes a master control unit (MCU) 16 that distributes operating power to cut-off devices 20 via a number of control lines 19. In the depicted embodiment, each of the series-connected chains of sub-groups 14 is operated by a separate control line 19, but other arrangements, such as a single MCU 16 output per sub-group 14, or one cut-off device 20 and control line per-PVA 12 is contemplated, depending on design requirements and cost considerations. The illustrated solar power generation system 10 is only an example of an arrangement and interconnection of PVAs 12 to which the principles disclosed herein are applied. Reliable rapid shutdown is provided by MCU 16 providing operating power for cut-off devices 20, which may serve as the sole control of cut-off devices in some embodiments. Failure of either a commercial mains power source 15 that is supplied to MCU 16, failure of the control lines 19, or removal of the mains power from MCU 16 via a manual switch SW1, will cause removal of activation power from cut-off devices 20, resulting in open-circuiting all of the connections between sub-groups 14. While all three legs/phases of commercial mains power source 15 are shown connected to MCU 16 for generality, in practice, due to the relatively low power requirements of MCU 16, less than three phases may be used to reduce complexity and interconnection. Control lines 19 may be provided in pairs, or a single wire may be connected between cut-off devices 20 and MCU 16 if a common ground is available, e.g., through a frame to which PVAs 12 are mechanically mounted and electrically grounded and to which the returns of MCU 16 corresponding to control lines 19 are electrically connected.

Figure 2A:
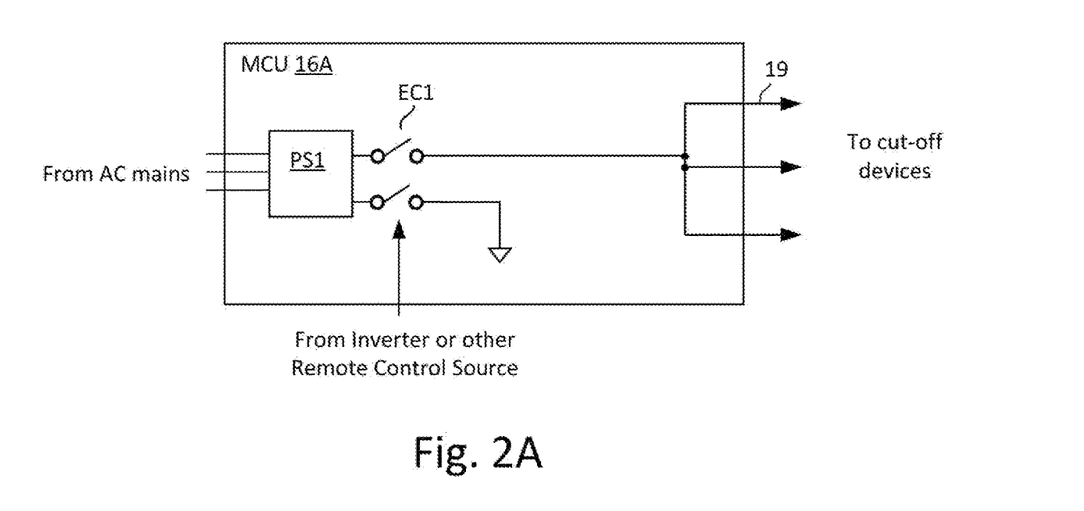
FIGS. 2A-2D are block diagrams showing example master control units 16A-16D, respectively, that may be used to implement master control unit 16 of example solar power generation system 10 of FIG. 1, in accordance with various embodiments of the disclosure.

Referring now to FIG. 2A, an example MCU 16A is illustrated, in accordance with an embodiment of the disclosure, and that may be used to implement MCU 16 of solar power generation system 10 described above. MCU 16A includes a power supply PS1, which may be, for example, a 480V three-phase to 24 VDC power supply, or alternatively may be a low-voltage AC output power supply having an AC voltage output of, for example, 18 VAC. While the examples illustrated herein are provided for use with a 3-phase commercial mains power supply of 480 VAC, the systems and devices disclosed herein are also suitable for other installations, such as single-phase residential 240 VAC/120 VAC systems, with the proper selection of MCU power supplies for the particular input power supply voltages available. An electrically-controlled switch EC1, which may be a relay, a solid-state relay or a metal-oxide semiconductor field-effect transistor (MOSFET), or other transistorized switch, is used to connect and disconnect the output of first power supply PS1 from the outputs of MCU 16A, which provide power to control lines 19 that distribute operating power to cut-off devices 20 in solar power generation system 10, as described above. Electrically-controlled switch receives a control input, which may be a control signal from inverter 18 or a real-time clock that energizes the outputs provided to control lines 19 only during the hours that incident solar irradiation is available, a signal from a remote control unit, or a signal from a manually operated switch provided in addition to switch SW1 (FIG. 1). Independent of electrically-controlled switch EC1, which may be optionally omitted, or alternatively connected between the input power source and power supply PS1, power provided to control lines 19 from MCU 16A will cease upon removal of mains power commercial mains power source 15, either by operation of switch SW1 or in event of a power failure from commercial mains power source 15.

Figure 2B:
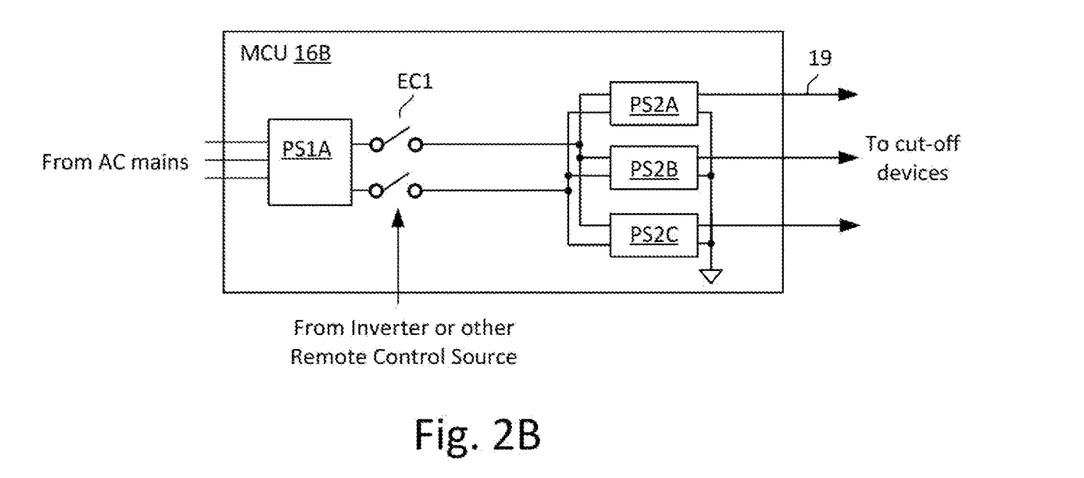

Referring now to FIG. 2B, another example MCU 16B is illustrated, in accordance with another embodiment of the disclosure, and that may be used to implement MCU 16 of solar power generation system 10 described above. MCU 16B, similar to MCU 16A of FIG. 2A as described above, includes a power supply PS1A, which is coupled to multiple second power supplies PS2A-PS2C, with one power supply provided for each of control lines 19 to supply power to corresponding cut-off devices 20. Power supply PS1A may be, for example, an AC output power supply that receives a 3-phase 480 VAC input and produces a single-phase 120 VAC output provided as an input to power supplies PS2A-PS2C, when electrically-controlled switch EC1 is closed. Alternatively, power supply PS1A may be omitted, electrically-controlled switch EC1 replaced with a three-pole electrically-controlled switch, and power supplies PS2A-PS2C replaced with DC-output power supplies having three-phase 480 VAC inputs. While the MCUs illustrated herein are described with reference to a commercial three-phase power system, the voltage of the commercial mains power system and the number phases/legs is not limiting, as mentioned above, the commercial mains power system may be a one- or two-phase residential 120 VAC/240 VAC system, or a multi-phase power system of other voltages, e.g., a 380 VAC three-phase system in some European countries, as well as 100 VAC/50 Hz systems in Japan, for example.

Figure 2C:
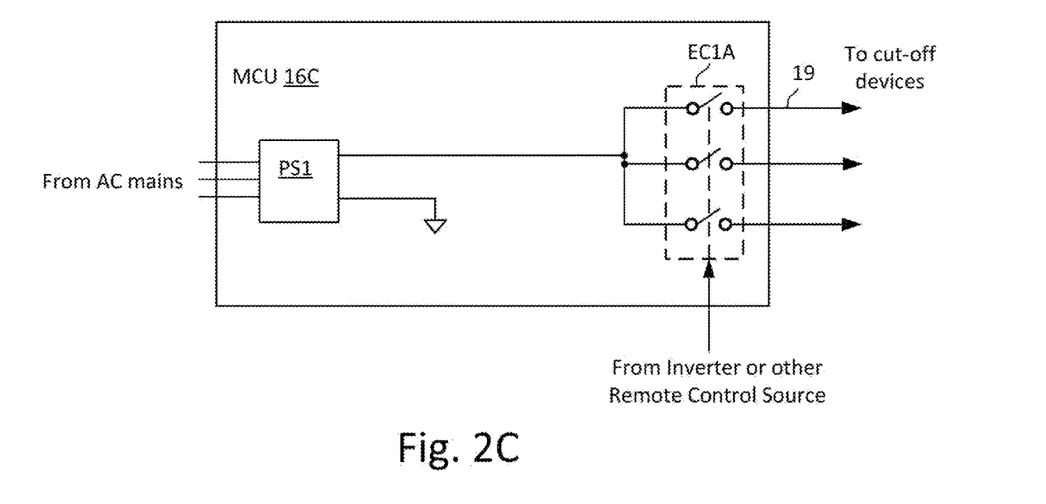

Referring now to FIG. 2C, another example MCU 16C is illustrated, in accordance with another embodiment of the disclosure, and that may be used to implement MCU 16 of solar power generation system 10 described above. MCU 16B, similar to MCU 16C of FIG. 2A as described above, includes an electrically-controlled switch EC1A having multiple poles (or implemented as multiple electrically-controlled switches), with a pole or switch for each output for control lines 19.

Figure 2D:
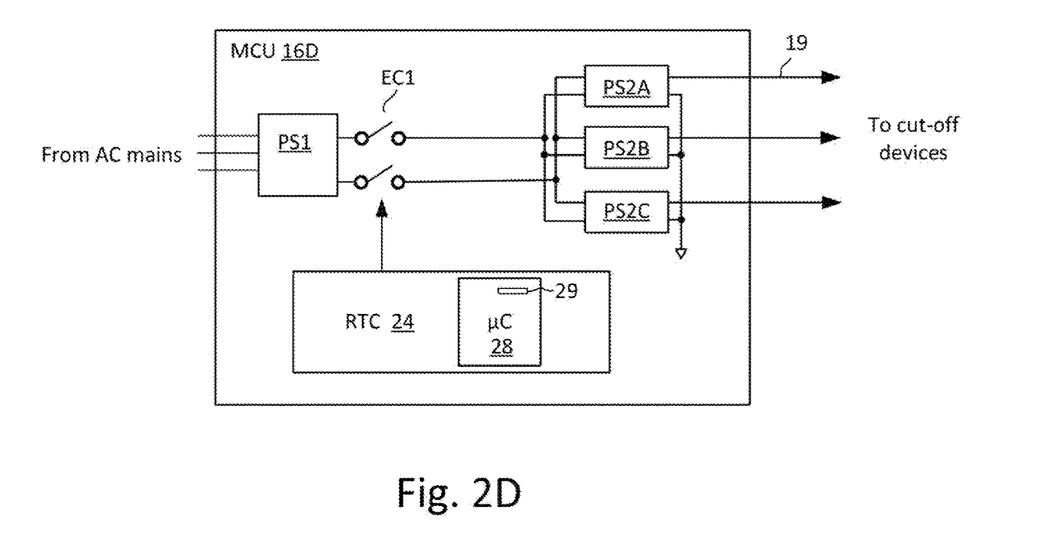

Referring now to FIG. 2D, another example MCU 16D is illustrated, in accordance with another embodiment of the disclosure, and that may be used to implement MCU 16 of solar power generation system 10 described above. MCU 16D, illustrates an example similar to MCU 16B of FIG. 2B, with a real-time clock (RTC) 24 incorporated within MCU 16D that closes electrically-controlled switch EC1 during the time interval when incident solar irradiation is expected to be available to PVAs 12. RTC 24 may be implemented by a micro-controller (µC) 28 executing program code stored in a non-volatile memory 29, as described in further detail below with reference to FIGS. 6A-6B. The above-described and illustrated examples provided by MCUs 16A-16D are provided as exemplary illustrations, and are not exhaustive. Features of MCUs 16A-16D may be combined in other embodiments. For example, an RTC 24 could be included in any of MCUs 16A-16D, with the appropriate control logic, control wiring, and/or switching provided to interrupt the output of power to control lines 19 when incident solar irradiation is expected to be unavailable. Further, the illustrated electrically-controlled switches could be effectively integrated within one or more of the power supplies used within MCUs 16A-16D, if the power supplies are provided with an enable input that can be signaled from inverter 18, an RTC module, a secondary manual cut-off switch, or any other control desired for disabling cut-off devices 20 to achieve rapid shutdown of high voltage PVA 12 series-combinations.

Figure 3A:
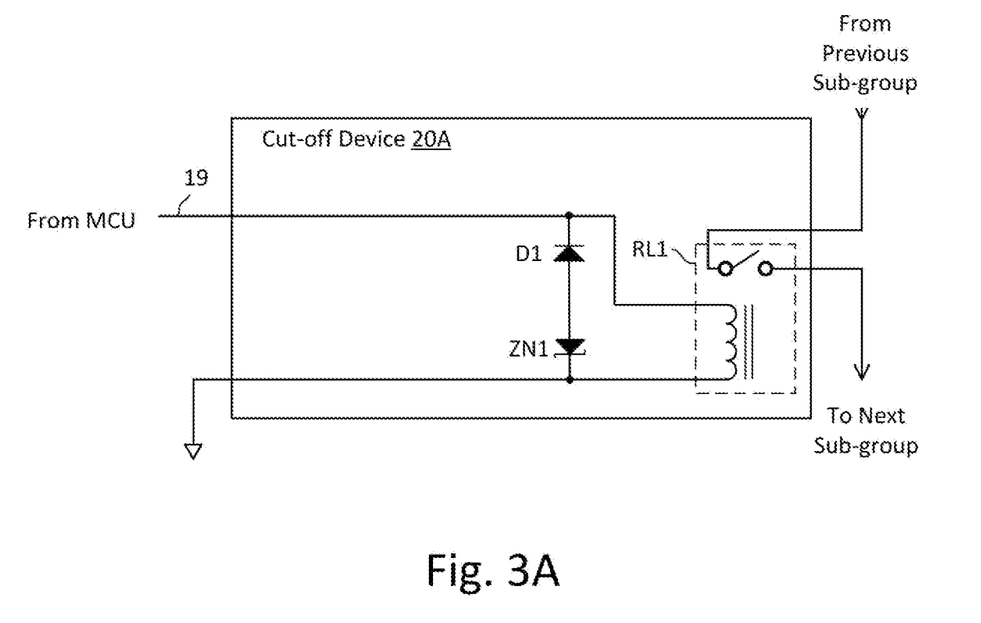
FIGS. 3A-3B are schematic diagrams and FIGS. 3C-3D are block diagrams, showing example cut-off devices 20A-20D, that may be used to implement cut-off devices 20 of example solar power generation system 10 of FIG. 1, in accordance with various embodiments of the disclosure.

Referring now to FIG. 3A, a schematic diagram of an example cut-off device 20A is illustrated, in accordance with an embodiment of the disclosure, which may be used to implement cut-off devices 20 in solar power generation system 10 of FIG. 1, as described above. Cut-off device 20A receives a signal from a corresponding one of control lines 19 supplied from MCU 16 (FIG. 1) and when voltage is present, e.g., 24 VDC, energizes the coil of a relay RL1 that joins the previous sub-group 14 to the next sub-group 14 of PVAs 12 in solar power generation system 10, as illustrated in FIG. 1. A protection diode D1 prevents generation of large voltage spikes due to back-emf when the coil of relay RL1 is de-energized, a protection Zener diode ZN1 protects against inrush voltage spikes that may occur when relay RL1 is energized and also provides faster de-energizing of the coil of relay RL1 when power is removed from the corresponding one of control lines 19. Both protection diode D1 and a protection Zener diode ZN1 also provide protection against other transients that may appear on control lines 19. Alternatively, relay RL1 may be an AC-winding relay designed to close when an AC voltage, e.g., 18 VAC is received from MCU 16, in which case diode D1 and Zener diode ZN1 are omitted, or replaced with a bi-directional transient voltage suppressor (TVS) or similar protection circuit.

Figure 3B:
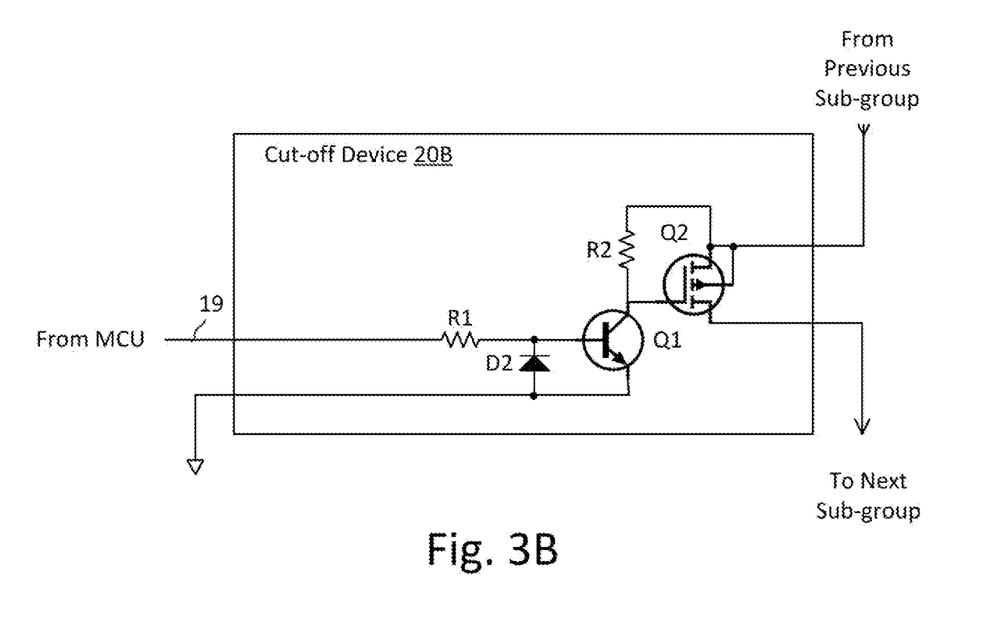

Referring now to FIG. 3B, a schematic diagram of another example cut-off device 20B is illustrated, in accordance with another embodiment of the disclosure, and that may be used to implement cut-off devices 20 in solar power generation system 10 of FIG. 1 as described above. Cut-off device 20B receives a signal from a corresponding one of control lines 19 supplied from MCU 16 (FIG. 1) and when voltage is present, e.g., 24 VDC, a P-channel MOSFET Q2 is turned on by voltage from the corresponding control line 19 turning on transistor Q1 via current provided through a resistor R1, which joins the previous sub-group 14 to the next sub-group 14 of PVAs 12 in solar power generation system 10, as illustrated in FIG. 1. A protection diode D2 protects transistor Q1 against negative voltage spikes that may be produced when transistor Q1 turns off, interrupting the current provided from control line 19.

Figure 3C:
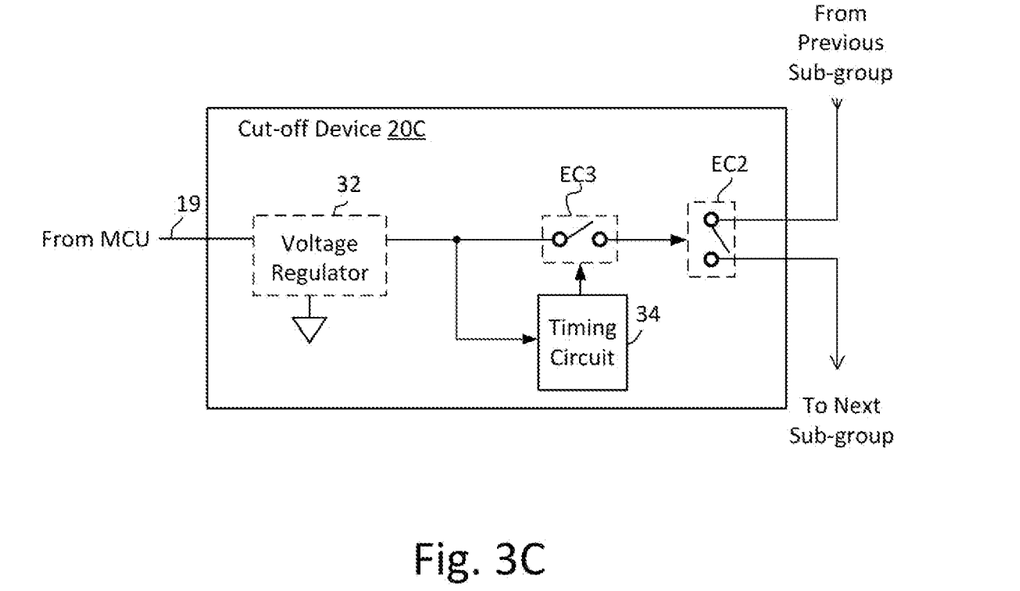

Referring now to FIG. 3C, a block diagram of another example cut-off device 20C is illustrated, in accordance with another embodiment of the disclosure, and that may be used to implement cut-off devices 20 in solar power generation system 10 of FIG. 1 as described above. Cut-off device 20C receives a signal from a corresponding one of control lines 19 supplied from MCU 16 (FIG. 1) and when voltage is present, e.g., 24 VDC, an electrically-controlled switch EC3 is supplied with an input voltage, which may be reduced by a voltage regulator 32, if needed. A timing circuit 34 controls activation of an electrically-controlled switch EC3, that, in turn supplies the activation current to another electrically-controlled switch EC2, which joins the previous sub-group 14 to the next sub-group 14 of PVAs 12 in solar power generation system 10, as illustrated in FIG. 1. A single electrically-controlled switch EC2 may be operated directly from timing circuit 34 if the output current from timing circuit 34 is sufficient to power electrically-controlled switch, e.g., if electrically-controlled switch EC2 is a MOSFET circuit as illustrated above. Timing circuit 34 provides a variable delay that ensures that all of cut-off devices 20 in solar power generation system 10 are not activated simultaneously. Simultaneous activation of relays, for example, requires a much greater current from the power supply/supplies in MCU 16, than activation at different times due to the difference between the pull-in current and the hold current of the relays, which may differ by an order of magnitude. Similarly, MOSFET circuits having a low on-resistance are generally provided by a device having a large area, and consequently, a high-capacitance gate, which will initially require significant current to change states, but virtually no current to maintain the MOSFET in an activated state. Timing circuit 34 may include an initial fixed delay, in order to allow MCU 16 output voltages to stabilize on control lines 19, and then a variable delay to prevent the likelihood of simultaneous activation of cut-off devices, e.g., by a random or pseudo-random delay generator, which may be implemented by dedicated logic, or by program code executed by a microcontroller as exemplified in FIG. 3D below.

Figure 3D:
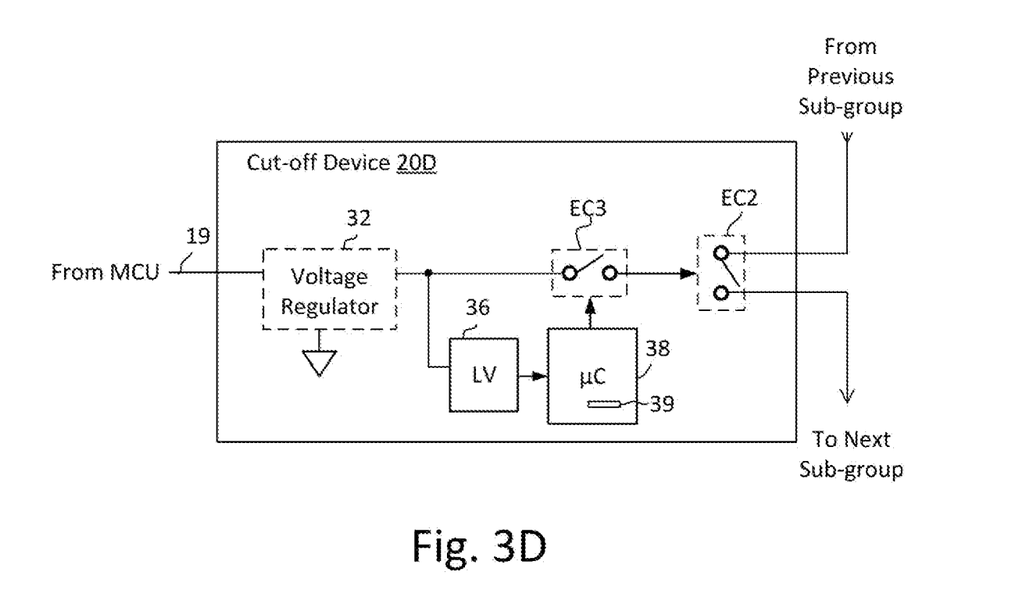

Referring now to FIG. 3D, a block diagram of another example cut-off device 20D is illustrated, in accordance with another embodiment of the disclosure, and that may be used to implement cut-off devices 20 in solar power generation system 10 of FIG. 1, as described above. Cut-off device 20D is similar to cut-off device 20C of FIG. 3C, so only differences between them are described in detail below. A micro-controller 38 executing program code stored in a non-volatile memory 39 is provided with operating voltage, e.g., 3.3 VDC or 5 VDC, from a low-voltage power supply 36, e.g., a regulator, Zener diode circuit, or a voltage divider, etc. Micro-controller 38 implements a timing circuit that provides the above-described randomly timed interval to ensure that electrically-controlled switch EC2 is not activated simultaneously with those in other cut-off devices 20.

Figure 4:
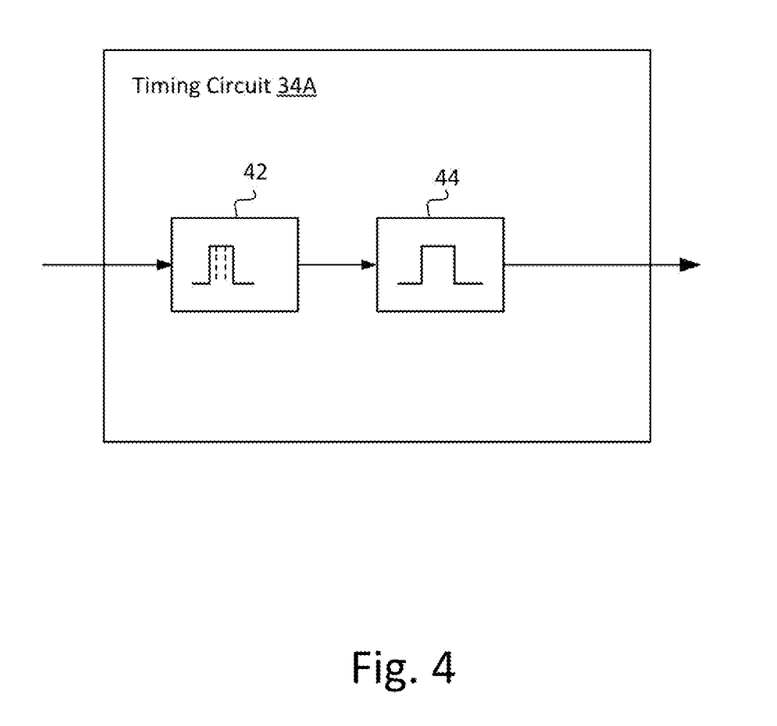
FIG. 4 is a block diagram showing an example timing circuit 34A, that may be used to implement timing circuit 34 of example cut-off device 20C FIG. 3C, in accordance with an embodiment of the disclosure.

Referring now to FIG. 4, a block diagram is shown, illustrating an example timing circuit 34A, that may be used to implement timing circuit 34 of example cut-off device 20C FIG. 3C, in accordance with an embodiment of the disclosure. A first one-shot 42 produces a variable delay, e.g., by pseudo-random count generation as described above. A second one-shot 44 is triggered by the output of one-shot 42 to add an additional fixed delay to provide a minimum start-up as described above.

Figure 5A:
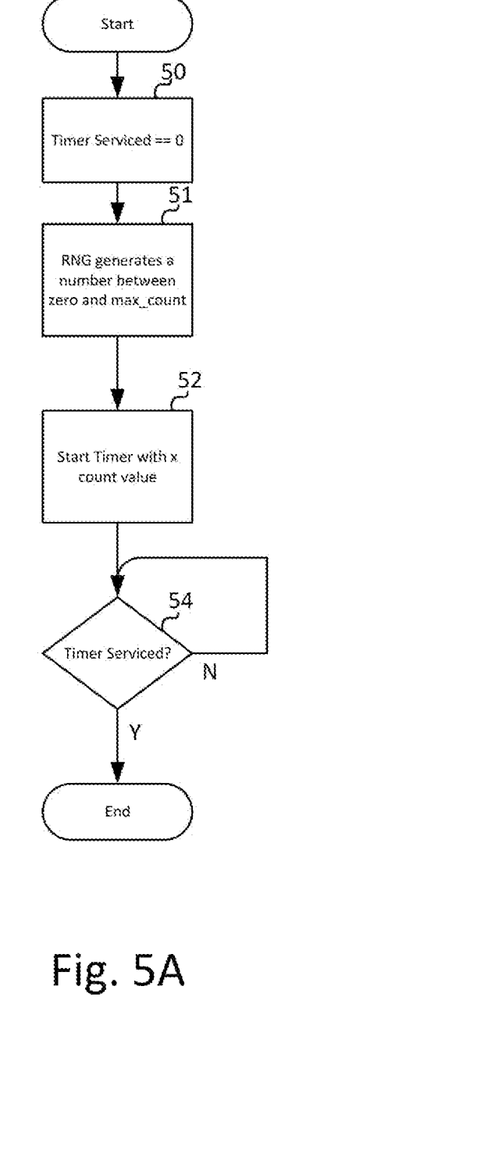
FIGS. 5A-5B are flowcharts depicting an example control method that may be implemented by program code executed by microcontroller 38 within cut-off device 20D of FIG. 3D, in accordance with an embodiment of the disclosure.
Figure 5B:
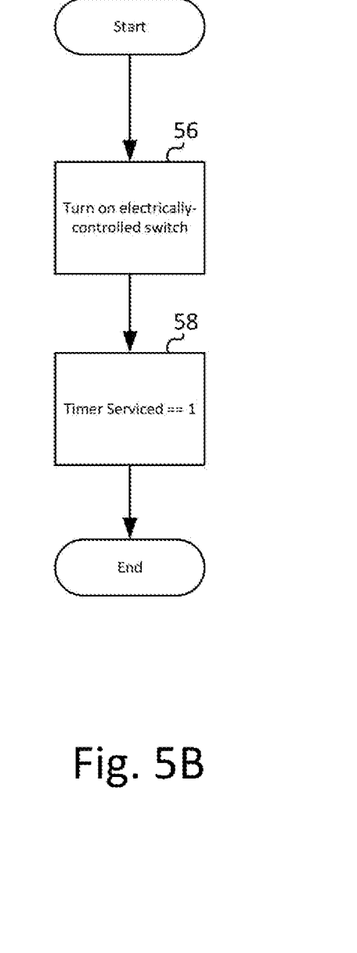

Referring now to FIGS. 5A-5B, flowcharts are shown depicting an example control method that may be implemented by program code executed by microcontroller 38 within cut-off device 20D of FIG. 3D, in accordance with an embodiment of the disclosure. FIG. 5A illustrates a main program loop of the program code, which may be chained with other functionality implemented by microcontroller 38, and FIG. 5B illustrates an interrupt service routine (ISR) that is entered when a timer interrupt occurs after a hardware timer within microcontroller 38 has reached a trigger event, e.g., when a preprogrammed countdown has reached zero. In the main program loop of FIG. 5A, a "timer serviced" flag is cleared (step 50) and a pseudo-random number generator routine generates a count value between zero and a maximum count value max_count (step 51). A timer is started with the generated count value (step 52) and until the timer serviced flag is set (decision 54), the main program enters a loop testing the timer serviced flag (decision 54). When the countdown interrupt occurs, the ISR illustrated in FIG. 5B is entered. Microcontroller 38 activates the electrically-controlled switch (step 56), e.g., electrically-controlled switch EC1 of cut-off device 20D, and sets the timer serviced flag (step 58), which will, in turn, cause the loop around decision (decision 54) to terminate. The two program flows illustrated in FIGS. 5A-5B are repeated for each startup of cut-off device 20 and in each cut-off device 20, so that cut-off devices do not activate their electronically-controlled output switches, e.g., electrically-controlled switch EC1 of cut-off device 20D simultaneously.

Figure 6A:
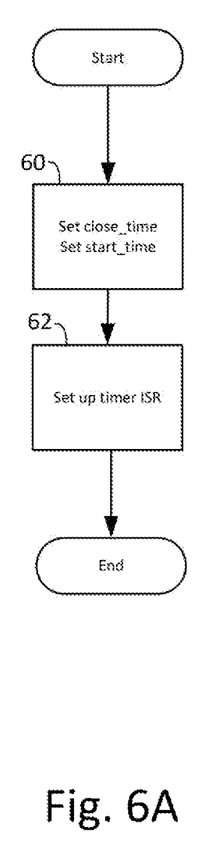
FIGS. 6A-6B are flowcharts depicting an example control method that may be implemented by program code executed by microcontroller 28 within MCU 16D of FIG. 2D, in accordance with an embodiment of the disclosure.
Figure 6B:
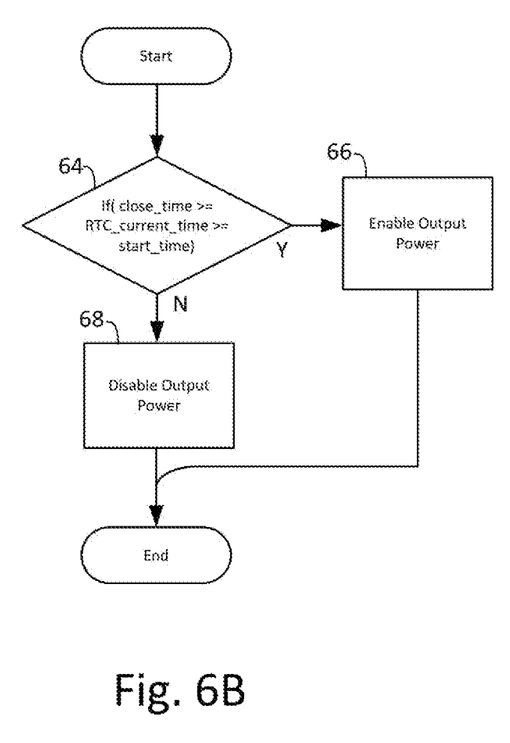

FIGS. 6A-6B are flowcharts depicting an example control method that may be implemented by program code executed by microcontroller 28 within MCU 16D of FIG. 2D, in accordance with an embodiment of the disclosure. The illustrated control method implements an RTC that controls electrically-controlled switch EC1 in MCU 16D, according to a current active time interval during which incident solar irradiation is expected to be available at PVAs 12 of FIG. 1. FIG. 6A illustrates a main program loop of the program code executed by microcontroller 28, which may be chained with other functionality implemented by microcontroller 28. FIG. 6B illustrates an ISR that is executed upon a one-second tick by a hardware timer/counter within microcontroller 28. The main program loop of FIG. 6A sets a value of start_time, which corresponds to the beginning of the active time interval, and sets a value of close_time, which corresponds to the end of the active time interval (step 60). The ISR is set up to have its execution triggered by a timer that generates an interrupt at one-second (or other) intervals (step 62). A hardware seconds counter in microcontroller 28 is also updated at occurrences of the interrupt signal. The routine illustrated in steps 60 and 62 need be repeated only when the values of close_time and start_time require updating. In the ISR illustrated by FIG. 6B, If RTC_current_time, which is the current count of the seconds counter is less than close_time and greater than start_time (decision 64), which indicates the active interval, output power from the outputs of MCU is enabled (step 66), which activates the cut-off devices to connect sub-groups 14 of PVAs 12 in example solar power generation system (FIG. 1). If RTC_current_time is greater than close_time or less than start_time (decision 64), output power from the outputs of MCU is disabled (step 68), which deactivates the cut-off devices to disconnect sub-groups 14 of PVAs 12 in example solar power generation system (FIG. 1).

In summary, this disclosure shows and describes example solar power generation systems and their methods of operation. The solar power generation systems may include a plurality of solar panels, a plurality of cut-off devices separate from the plurality of solar panels. The cut-off devices are coupled in series with corresponding sub-groups of the plurality of solar panels and may connect and disconnect outputs of the corresponding sub-groups from a solar power output chain or bus. The solar power generation systems also include a master control unit that may have at least one power supply output coupled to the plurality of cut-off devices and a power supply input receiving a power source independent of an output of the plurality of solar panels. The cut-off devices may be de-activated to open-circuit a connection of the corresponding sub-group when the power source is removed from the power supply input.

In some embodiments, the master control unit may include an electrically controlled switch responsive to a master unit power control signal that may couple the power source independent of an output of the plurality of solar panels to the power supply input. The master control unit may have a plurality of power supply outputs separately and individually coupled to corresponding ones of the plurality of cut-off devices as the at least one power supply output. In some embodiments, the master control unit may include a plurality of DC-output power supplies for generating the plurality of power supply outputs, and the inputs of the plurality of DC-output power supplies may be coupled to an input provided from a commercial line AC power source as the power source independent of an output of the plurality of solar panels. In some embodiments, the at least one power supply output may provide the sole control mechanism for deactivating the plurality of cut-off devices. In some embodiments, the sub-groups may consist of individual solar panels, while in other embodiments, the sub-groups may include multiple series-connected solar panels.

In some embodiments, the at least one power supply output may be an AC power supply output and the plurality of cut-off devices may each include a DC power supply having an input coupled to the AC power supply output, or relay having an AC-operated coil (AC coil-type relay). In some embodiments the plurality of cut-off devices may each include a switching circuit for connecting and disconnecting the corresponding sub-group from the solar power output chain or bus, and a timing circuit for controlling activation of the switching circuit according to a variable timing scheme. A turn-on delay of the switching circuit may be controlled so that the plurality of cut-off devices do not activate their corresponding switching circuits with the same delay after power is received from the at least one power supply output of the master control unit. In some embodiments, the timing circuit may be provided by a microcontroller executing stored program code that implements the turn-on delay as a randomly-generated value.

While the disclosure has shown and described particular embodiments of the techniques disclosed herein, it will be understood by those skilled in the art that the foregoing and other changes in form, and details may be made therein without departing from the spirit and scope of the disclosure. For example, the techniques shown above may be applied to other types of series-connected power sources.

What is claimed is:

1. A solar power generation system, comprising:
   a plurality of solar panels organized in sub-groups interconnected in series, wherein the sub-groups are interconnected in series by single electrical conductors extending between the sub-groups;
   a plurality of cut-off devices separate from the plurality of solar panels, wherein each of the plurality of cut-off devices is configured to interrupt only a single corresponding one of the single electrical conductors to prevent conduction of current and summation of voltage between a pair of the sub-groups interconnected by the corresponding one of the single electrical conductors, and wherein individual ones of the plurality of cut-off devices are only connected to the plurality of solar panels by a single pair of connections made to corresponding ones of a corresponding pair of the sub-groups that are interconnected by the individual cut-off devices, so that any one of the cut-off devices is only connected by a single connection to any one of the plurality of solar panels, and so that the individual cut-off devices do not receive both of a power connection and an associated return connection from the plurality of solar panels; and a master control unit having at least one power supply output coupled to the plurality of cut-off devices and a power supply input receiving a power source independent of an output of the plurality of solar panels, wherein the cut-off devices are de-activated to open-circuit a connection of the corresponding sub-group when the power source is removed from the power supply input.

2. The solar power gdeneration system of claim 1, wherein the master control unit further includes an electrically controlled switch responsive to a master unit power control signal that couples the power source independent of an output of the plurality of solar panels to the power supply input.

3. The solar power generation system of claim 1, wherein the master control unit has a plurality of power supply outputs separately and individually coupled to corresponding ones of the plurality of cut-off devices as the at least one power supply output.

4. The solar power generation system of claim 3, wherein the master control unit comprises a plurality of DC-output power supplies for generating the plurality of power supply outputs, wherein inputs of the plurality of DC-output power supplies are coupled to an input provided from a commercial line AC power source as the power source independent of an output of the plurality of solar panels.

5. The solar power generation system of claim 1, wherein the at least one power supply output provides the sole control mechanism for deactivating the plurality of cut-off devices.

6. The solar power generation system of claim 1, wherein the sub-groups consist of individual solar panels.

7. The solar power generation system of claim 1, wherein the sub-groups comprise multiple series-connected solar panels.

8. The solar power generation system of claim 1, wherein the at least one power supply output is an AC power supply output, and wherein the plurality of cut-off devices each include a DC power supply having an input coupled to the AC power supply output.

9. The solar power generation system of claim 1, wherein the plurality of cut-off devices each include:
a switching circuit for connecting and disconnecting the corresponding sub-group from the solar power output chain or bus; and
a timing circuit for controlling activation of the switching circuit according to a variable timing scheme, wherein a turn-on delay of the switching circuit is controlled so that the plurality of cut-off devices do not activate their corresponding switching circuits with the same delay after power is received from the at least one power supply output of the master control unit.

10. The solar power generation system of claim 9, wherein the timing circuit is provided by a microcontroller executing stored program code that implements the turn-on delay as a randomly-generated value.

11. The method of claim 10, further comprising coupling the master control unit and the plurality of cut-off devices in parallel by pairs of conductors, so that an open-circuit failure of one of the cut-off devices does not cause a failure of all of the cut-off devices.

12. The solar power generation system of claim 1, further comprising:
one or more timers that determine a time interval during which solar irradiation is expected to be available to the plurality of solar panels; and
one or more circuits coupled to an output of a corresponding one of the one or more timers that deactivate the cut-off devices to disable the solar power generation system if the corresponding timer is not within the time interval.

13. The solar power generation system of claim 1, wherein an output of the master control unit is coupled in parallel to the plurality of cut-off devices, so that an open-circuit failure of one of the cut-off devices does not cause a failure of all of the cut-off devices, wherein the master control unit and the plurality of cut-off devices are interconnected by pairs of conductors providing the parallel coupling.

14. A method of operation of a solar power generation system comprising a plurality of solar panels organized in sub-groups interconnected in series by single electrical conductors extending between the sub-groups, the method comprising:
interrupting the single electrical conduction paths with a plurality of cut-off devices, wherein each of the plurality of cut-off devices is separate from the plurality of solar panels and is configured to interrupt only a single corresponding one of the single electrical conductors to prevent conduction of current and summation of voltage between a pair of the sub-groups interconnected by the corresponding one of the single electrical conductors, and wherein individual ones of the plurality of cut-off devices are only connected to the plurality of solar panels by a single pair of connections made to corresponding ones of a corresponding pair of the sub-groups that are interconnected by the individual cut-off devices, so that any one of the cut-off devices is only connected by a single connection to any one of the plurality of solar panels, and so that the individual cut-off devices do not receive both of a power connection and an associated return connection from the plurality of solar panels;
controlling the connecting and disconnecting of the sub-groups by a master control unit having at least one power supply output coupled to the plurality of cut-off devices and a power supply input receiving a power source independent of an output of the plurality of solar panels; and
deactivating the cut-off devices to open-circuit a connection of the corresponding sub-group by the power source being removed from the power supply input.

15. The method of claim 14, further comprising responsive to a master unit power control signal, coupling and decoupling the power source independent of an output of the plurality of solar panels with the power supply input.

16. The method of claim 14, wherein the master control unit has a plurality of power supply outputs, and wherein the method further comprises separately and individually coupling the plurality of power supply outputs to corresponding ones of the plurality of cut-off devices as the at least one power supply output.

17. The method of claim 16, further comprising:
generating the plurality of power supply outputs from a plurality of DC-output power supplies within the master control unit; and
coupling inputs of the plurality of DC-output power supplies to an input provided from a commercial line AC power source as the power source independent of an output of the plurality of solar panels.

18. The method of claim 14, wherein the at least one power supply output provides the sole control mechanism for deactivating the plurality of cut-off devices.

19. The method of claim 14, wherein the sub-groups consist of individual solar panels.

20. The method of claim 14, wherein the sub-groups comprise multiple series-connected solar panels.

21. The method of claim 14, wherein the at least one power supply output is an AC power supply output, and wherein the plurality of cut-off devices each include a DC power supply having an input coupled to the AC power supply output or.

22. The method of claim 14, further comprising:
connecting and disconnecting the corresponding sub-group from the solar power output chain or bus with a switching circuit in the corresponding cut-off device; and
controlling activation of the switching circuit with a timing circuit according to a variable timing scheme, wherein a turn-on delay of the switching circuit is controlled so that the plurality of cut-off devices do not activate their corresponding switching circuits with the same delay after power is received from the at least one power supply output of the master control unit.

23. The method of claim 22, wherein the timing circuit is provided by a microcontroller, and wherein the method comprises executing the stored program code to implement the turn-on delay as a randomly-generated value.

24. The method of claim 14, further comprising:
determining whether or not incident solar irradiation is expected to be available to the plurality of solar panels; and
automatically, in response to determining that incident solar irradiation is not expected to be available to the solar panels, disabling the solar power generation system by deactivating the cut-off devices.

\* \* \* \* \*